United States Patent [19]
Briggs et al.

[11] 4,005,053
[45] Jan. 25, 1977

[54] POLYMER-OIL-BLACK MASTERBATCH

[75] Inventors: George James Briggs; Ernest Jack Buckler; Yung-Kang Wei, all of Sarnia, Canada

[73] Assignee: Polysar Limited, Sarnia, Canada

[22] Filed: May 27, 1975

[21] Appl. No.: 581,086

[30] Foreign Application Priority Data

June 25, 1974 Canada ................................ 203375

[52] U.S. Cl. .................. 260/33.6 AQ; 260/29.7 H; 260/29.7 T; 260/29.7 W; 526/312; 526/320; 528/493

[51] Int. Cl.² ............. C08F 216/04; C08F 226/02; C08K 5/01

[58] Field of Search .................. 260/29.7 H, 29.7 T, 260/29.7 V, 33.6 AQ, 80.3 N, 80.7, 42.55, 94.7 A; 526/312, 320; 528/493

[56] References Cited

UNITED STATES PATENTS

| | | | |
|---|---|---|---|
| 2,651,624 | 9/1953 | Swart | 260/29.7 T |
| 3,440,232 | 4/1969 | Cramm et al. | 526/312 |
| 3,700,620 | 10/1972 | Burke | 260/33.6 AQ |
| 3,700,621 | 10/1972 | Burke | 260/33.6 AQ |
| 3,780,003 | 12/1973 | Seymour et al. | 526/320 |
| 3,816,315 | 6/1974 | Morduchowitz et al. | 526/312 |
| 3,875,101 | 4/1975 | MacLeod | 260/29.7 T |
| 3,904,580 | 9/1975 | Lasis et al. | 260/80.7 |

Primary Examiner—Donald E. Czaja
Assistant Examiner—H. H. Fletcher
Attorney, Agent, or Firm—Stevens, Davis, Miller & Mosher

[57] ABSTRACT

An improved masterbatch of polymer, oil and carbon black is provided, and a process for the manufacture thereof, in which the polymer contains reactive groups and the masterbatch contains a crosslinking agent reactive with the reactive groups of the polymer in sufficient amount to form a low concentration of crosslinks in order to increase the strength of the polymer, the crosslinks being easily broken by the action of shear and/or heat and reformable thereafter, so that high levels of oil and carbon black can be incorporated into the masterbatch.

17 Claims, No Drawings

POLYMER-OIL-BLACK MASTERBATCH

This invention is directed to a process for the manufacture of an improved masterbatch of synthetic rubber, oil and carbon black and the improved product thereof.

It is well known in the synthetic rubber industry that synthetic rubbers may be mixed with processing oils and with carbon blacks to yield both oil-extended rubbers and oil-carbon black masterbatches, both of which have significant commercial use. Many processes have been proposed for the manufacture of such compositions.

It is also well known in the industry using the synthetic rubbers that the synthetic rubbers need to be mixed with a variety of compounding ingredients so that the compound can be vulcanized and so that the vulcanizate can have acceptable use properties. The mixing of the synthetic rubber and the various compounding ingredients is done either on a two-roll rubber mill or in an internal mixer such as a Banbury. In the process of mixing synthetic rubbers with the compounding ingredients various amounts of process oils and carbon blacks are included as part of the compounding ingredients. When so used, the mixing is extremely sensitive to the quantities of oil and/or black present in the mixture. For example, when there is a high level of oil present, the mixing is initially very slow because of the low viscosity of the oil compared to the high viscosity of the rubber, the oil tending to act as a lubricant. When there is a high level of black present the viscosity of the whole system is extremely high due to the black present and remains so until the carbon black is reasonably well dispersed within the rubber phase. Because of these and related mixing problems oil-extended polymers or the oil-carbon black masterbatches are frequently used and are of great commercial significance.

Masterbatches of rubber and oil can, from a practical view point, only contain a certain maximum level of oil. If the oil loading is too high, the masterbatch becomes too soft to handle on a commercial scale and tends to flow readily. The oil may also tend to bleed out of the masterbatch. Similarly, the same problems are encountered in masterbatches of oil, carbon black and rubber; the oil level can only attain a certain practical maximum which, in turn, influences the amount of black that can be incorporated to achieve a practical system. The rubber-consuming industry has, therefore, had to add additional oils and/or carbon blacks in its processing in order to achieve the levels of oil and black necessary for its business. This addition of oil and/or carbon black during the mixing process is troublesome, time consuming and energy consuming.

It has now been discovered that an improved masterbatch of synthetic rubber, oil and carbon black may be prepared wherein high levels of oil and black can be practically achieved without the aforesaid problems by the use of a synthetic rubber which contains a low concentration of crosslinks, which crosslinks can be easily broken by the action of shear and/or heat, the concentration of crosslinks being sufficient to impart the masterbatch with the necessary strength and non-flow characteristics.

It is an objective of this invention to provide a process for the manufacture of an improved masterbatch of synthetic rubber, oil and carbon black.

It is a further objective of this invention to provide an improved masterbatch of synthetic rubber, oil and carbon black. The improved masterbatch contains higher levels of oil and black than conventionally commercially available but yet does not have the previously attendant problems associated therewith.

The rubbers embraced by this invention are polymers which are prepared by a free radical emulsion polymerization process. Such polymers are prepared so as to contain reactive groups, as hereinafter defined. The polymer is mixed with a hydrocarbon oil and a carbon black. Also mixed with the polymer is a crosslinking agent which is reactive with the reactive groups of the polymer. The crosslinking agent acts to cause the formation of the limited concentration of crosslinks which improve the strength and non-flow characteristics of the polymer, by virtue of which a higher level of oil and black can be incorporated into the masterbatch. The dry masterbatch is readily mixed by the rubber user with other polymers and with the various compounding ingredients necessary including, if desired, additional oil and carbon black.

The essential feature of this invention is the use of a synthetic polymer which contains a limited concentration of crosslinks which can be broken by shear and/or heat, one effect of the presence of the crosslinks being manifested in the polymer having high strength. The polymer contains reactive groups which act as sites for crosslinking, the crosslinks being shear and/or temperature sensitive such that they are broken on factory processing, thereby allowing easy processing of the polymer, whereas at ambient temperatures, the crosslinks are present in the polymer and provide the necessary strength and non-flow to the composition. The concentration of such crosslinks is low and of a completely different order to that normally encountered in vulcanizates. Additionally, the crosslinks are reformable after being broken.

The polymers of the invention are polymers of conjugated diolefins containing from 4 to 8 carbon atoms. Suitable conjugated diolefins include butadiene, isoprene, 2, 3-dimethyl butadiene and piperylene. Preferred conjugated diolefin polymers may contain up to 50% by weight of a copolymerizable olefinically unsaturated monomer. Suitable copolymerizable monomers include styrene, alphamethyl styrene, the vinyl toluenes, acrylonitrile, methacrylonitrile, vinyl pyridine and the like. The polymer may also contain small amounts of a crosslinking copolymerized monomer such as divinyl benzene. Preferred polymers are polybutadiene, styrene-butadiene polymers containing 15 to 40 weight % of styrene, butadiene-acrylonitrile polymers containing from 25 to 50 weight % of acrylonitrile and isopreneacrylonitrile polymers containing from 25 to 40% of acrylonitrile. The polymer also contains a copolymerized monomer which contains reactive groups. Suitable reactive groups include tertiary amine, hydroxy and aldehyde groups. Such copolymerized monomers include dimethylaminoethyl methacrylate and like monomers of the general form

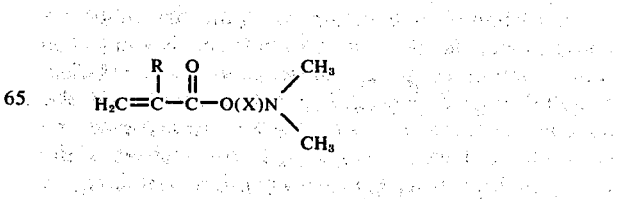

where R is hydrogen or methyl and X is an aliphatic hydrocarbon group of 2 to 4 carbon atoms or a secondary or tertiary amine substituted aliphatic hydrocarbon group of 2 to 4 carbon atoms; the reactive group for this class of monomers is the tertiary amine group. Suitable monomers include hydroxy ethyl acrylate and like monomers of the general form

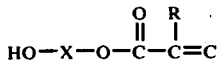

where R is hydrogen or methyl and X is an aliphatic hydrocarbon group of 2 to 4 carbon atoms, the reactive group being the hydroxy group. Suitable monomers also include olefinically substituted aldehyde compounds of the general form

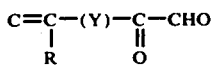

where R is hydrogen or methyl and Y is a hydrocarbon group selected from aliphatic groups containing 2–6 carbon atoms and from aromatic groups containing at least one aromatic nucleus; the reactive group for this class of monomer is the aldehyde group. The concentration of the copolymerized monomer in the polymer is quite low, being not more than about 2.5 weight %, usually not more than about 1.5 weight %, but not less than 0.2 weight %.

The processing oil used in admixture with the polymer of this invention is selected from those conventionally used in the extension of synthetic polymers. For the SBR polymers the oils include the naphthenic, the aromatic and the highly aromatic oils. The amount of such oil added to the polymer is from about 50 parts by weight to about 150 parts by weight based on the polymer. Preferred amounts of oil added to the polymer are from about 80 parts by weight to about 125 parts by weight. For the polymers containing acrylonitrile, which are not compatible with hydrocarbon processing oils, the type of extension uses the extenders conventional for that type of polymer such as dioctyl phthalate in amounts ranging from about 20 to about 50 parts by weight per 100 parts of polymer.

The types of carbon black incorporated into the masterbatch with the polymer and the oil are those well known to the industry. These include the thermal blacks, the channel blacks and the furnace blacks. The preferred types of carbon black are the furnace blacks. The amount of carbon black incorporated into the masterbatch ranges from about 50 to about 250 parts by weight per 100 parts of polymer. A preferred range for the level of carbon black is from about 80 parts to about 175 parts by weight and most preferably from 100 to 125 parts by weight. As is well known in the industry, when the black level is very high, the oil level usually is also high.

The carbon black is incorporated into the rubber by conventional means. The carbon black is slurried in water, optionally in the presence of an emulsifier, passed through a homogenizer and then mixed with the aqueous latex stream. The oil is also incorporated by conventional means which include the addition of the oil, as such or as an aqueous emulsion containing an emulsifying agent, to the carbon black and polymer aqueous stream. The stream containing the polymer, black and oil is then passed to a coagulation vessel and contacted therein with a coagulation agent which is usually an aqueous acidic medium. The coagulation vessel is equipped with an agitator and the coagulation agent and the polymer-oil-black aqueous slurry are mixed under conditions of fairly high agitation in order to obtain a uniform particle size product. The so-formed coagulum is separated from the water stream and passes as a water-wet coagulated rubber-oil-black mixture to a drying means, which may be any one of those conventionally known in the industry and including hot air driers, extrusion driers and flash driers.

The crosslinking agent is selected such as to react with the reactive groups of the polymer and contains at least two groups capable of reaction with the reactive groups of the polymer. Thus, for a polymer containing tertiary amine grooups, the crosslinking agent is a compound containing reactive halogen groups, particularly allylic halogen groups. Suitable halogens include chlorine, bromine and iodine and are preferably selected from chlorine and bromine. The agents preferably contain allylic bromide or allylic chloride groups in terminal positions in the crosslinking agent and are, therefore, preferably difunctional in allylic halide.

Examples of such crosslinking agents containing allylic halide groups include 1,4-dibromobutene-2, 1,4-dichlorobutene-2, $\alpha,\alpha^1$-dibromo-xylenes such as $\alpha,\alpha^1$-dibromo-p-xylene, $\alpha\alpha^1$-dichloroxylenes, particularly $\alpha,\alpha^1$-dichloro-p-xylene and liquid dibromopolybutadiene having bound essentially terminal allylic bromide groups with a polymer molecular weight of about 200 to about 5000, preferably about 800 to about 2000.

When the polymer contains hydroxy groups as the reactive group, the crosslinking agent is preferably a polyaldehyde compound containing aldehyde groups activated by adjacent carbonyl or methoxy groups. Suitable polyaldehyde compounds have the form

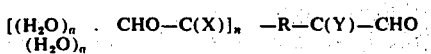

in which R is an organic group comprising one or more aromatic rings or an aliphatic group having not less than three carbon atoms, one of which is quaternary, $n$ is 1 or 2, X and Y are the same and are selected from oxygen and di(methoxy) and $a$ is 0 or 1. Preferred polyaldehyde compounds are those where n is 1, i.e. disaldehyde compound. Preferred dialdehydes are those in which X and Y are oxygen. When R is an aliphatic group, the polyaldehyde contains preferably not more than 10 carbon atoms, that carbon atom joining the rest of the molecule being quaternary. Examples of suitable polyaldehydes include 1, 3, 5 triglyoxalyl benzene, o - and p -diglyoxalyl benzene, 4,4'-diglyoxalyl biphenyl, 4,4'-diglyoxalyl biphenyl ether, 4,4'-bis(dimethoxy formyl methyl) biphenyl ether and 2,2-dialyoxalyl propane, all of which may contain one mole of water of hydration per aldehyde group.

For polymers containing aldehyde groups as the reactive group, suitable crosslinking agents are those containing hydroxy or mercaptan groups. Such agents contain from two to four hydroxy or mercaptan groups, preferably two such groups. Examples of suitable crosslinking agents include ethylene glycol and homologous members of the series up to that containing ten carbon atoms, glycerol, butane triol, the dimercaptans of form HS—(CH$_2$)$_n$—SH where $n$ is from 2 to 10, the naphthalene dithiols and the o- and p-dimercaptobiphenyls.

The crosslinking agent is incorporated into the polymer by addition to the coagulation vessel or by addition to the drying means. When added to the coagulation vessel, the crosslinking agent may be added as such or may be added dissolved or dispersed in the hydrocarbon oil stream or part thereof. The mixing occurring in the coagulation vessel allows the crosslinking agent to be dispersed throughout the polymer-oil-black mixture. When added to the drying means, it may be added as a pure material or in the presence of an organic or aqueous phase or the addition may be as a spray to a surface of a sheet or layer of the masterbatch or to a mixing means, such as an extruder, forming part of the drying means. The crosslinking agent reacts with the reactive groups of the polymer under conditions of somewhat elevated temperature. The temperature normally encountered in a coagulation vessel is of the order of 180° F or higher and the temperature normally encountered in the drying means is normally of the order of 250° F or higher. These temperature ranges are sufficient to cause the reaction of the crosslinking agent with the reactive groups of the polymer, thereby, leading to the formation of a polymer having a low concentration of crosslinks therein.

The crosslinking agent may be susceptible to chemical modification under the conditions of addition to the polymer — for example, compounds containing allylic halogen groups may be hydrolyzed, at least in part, under the conditions frequently encountered for the coagulation of SBR rubbers. When this may occur, a minor modification can be made of the method of adding the crosslinking agent to the polymer in order to obtain efficient and controlled utilization of the crosslinking agent. A suitable such modification of the addition procedure is to coagulate the oil-black-polymer mixture and to add the crosslinking agent, optionally dissolved in a portion of the oil, immediately after the coagulation and optionally when the pH of the coagulated mixture is close to neutrality, i.e. pH 6 to 8.

The presence of the crosslinks in the masterbatch is of significant importance. The polymer has a higher strength than that normally associated with such synthetic polymers and this higher strength appears to be the reason why higher oil and black levels can be incorporated into the polymer. Such crosslinked polymers containing high oil levels, up to for example 100 parts of oil and no carbon black, do not exhibit cold flow and yet, because of the temperature sensitivity of the crosslinks at processing temperatures normally encountered in a rubber processing factory, behave as though there were no crosslinks present in the polymer when being so processed. When the masterbatch contains polymer, oil and black, it appears that the limited number of crosslinks incorporated into the polymer allow the incorporation of the large amount of both the oil and the carbon black. If the polymer were not crosslinked, the Mooney of the masterbatch would be considerably lower. The presence of the limited concentration of crosslinks does not detract from the conventional interaction which occurs between the carbon black and the polymer chains.

The high strength of the crosslinked polymer is exhibited in many ways. The lack of cold flow, as above, is but one example. Additionally this is shown by an increased Mooney value and by higher green strength for the masterbatch itself and when compounded with other synthetic rubbers. As is normal for rubbers, the masterbatch loses strength at processing temperatures and behaves as a conventional rubber, the crosslinks having been broken. However, the crosslinks reform subsequent to the processing and, at ambient temperatures, the masterbatch again exhibits the higher strength characteristics.

The following examples serve to illustrate the invention, not to limit the scope thereof.

EXAMPLE 1

The purpose of this Example is to illustrate the effect of crosslinking the polymer when a large amount of oil is present and how the improved polymer then exhibits higher strength, as shown by higher Mooney values and by higher green strength when blended with another rubber.

Three polymers of styrene and butadiene were used. Polymer A was a commercial polymer contained 23.5 weight per cent of bound styrene, contained 1 part by weight per 100 parts by weight of polymer of a diaryl-p-phenylene diamine antioxidant and had a Mooney value (small rotor, 4 minutes running time at 100° C, i.e. MS-4/100) of 60. Polymer B is an experimental polymer containing 23.5 weight percent of bound styrene, 0.89 weight percent of bound dimethylaminoethyl methacrylate and butadiene, contained 1 part by weight of polymer of antioxidant (as above) and had a Mooney value (MS-4/100) of 60. Polymer C is an experimental polymer containing 24.6 weight per cent of bound styrene, 0.86 weight per cent of bound dimethylaminoethyl methacrylate, the balance being butadiene, contained 1.45 parts by weight of antioxidant and had a Mooney value (MS-4/100) of 70. 100 gram samples of each rubber were, separately, sheeted out on a two roll rubber mill following which was added 120 grams of a high aromatic oil (Type 101 of ASTM D 2226) and the mixture was milled to yield a uniform heat. A sample of each blend was used to measure the Mooney value. A further sample (66 grams) of each blend was added to the Banbury head of a Brabender mixture and 0.15 g (i.e. 05 parts per hundred of rubber) of 1,4-dibromobutene-2 added and the whole mixed at a temperature of 72° C and with a rotor speed of 100 rpm for 3 minutes to obtain uniform dispersion of the dibromobutene. A quantity of this mixture was used to measure the Mooney value. A further sample (22 grams) of this mixture was again added to the Brabender mixer, 13.75 grams of a high cis-1,4 polybutadiene containing 37.5 parts per hundred of rubber of an aromatic oil (TAKTENE 1252; TAKTENE is a registered Trademark) were added and the mixer started; after 1 minute of mixing 20.0 grams of a carbon black (an HAF black) (i.e. 50 parts of SBR polymer + 50 parts polybutadiene + 80 parts of oil + 100 parts of black) and the whole was mixed for a total time of 5 minutes. A portion of this compounded stock was used for Mooney measurement (ML-4/100) and a portion was molded into sheets and tested after resting for 24 hours for stress-strain properties using an Instron is a registered Trademark) at room temperature and a jaw separation rate of 50 cm/min.

The results of the tests on all of these compositions are shown in Table 1. The polymer A shows a very low Mooney on oil extension which is unaffected by the addition of the dibromobutene and exhibits, when compounded with polybutadiene and carbon black, very poor green strength, the strength decreasing on going from 100% extension to 200% extension from 1.8 kg/cm² to 1.5 kg/cm², a decrease of 17%. The experimental polymers B and C exhibit, similarly, very low Mooney on oil extension, but on treatment with dibromobutene, the Mooney was raised to an unexpectedly increased level. Polymer B, when compounded as shown in IV, yielded a high Mooney compound with very high green strength, the strength increasing by 50% on going from 100% extension to 200% extension.

Further to the results in Table 1, Samples II and III of each of polymers A and B were formed into 1 inch diameter pellets, placed on sheets of tissue paper and a 100 gram weight having a 1 inch diameter base was placed on each pellet. Within 1 day, samples II and III of polymer A and sample II of polymer B had flowed extensively under the weight and some of the oil had migrated through the sheets of tissue paper whereas sample III of polymer B, i.e. that sample treated with dibromobutene, had shown little evidence of flow and essentially no migration of the oil.

TABLE 1

|   | Polymer Identification | A | B | C |
|---|---|---|---|---|
| I | Original Mooney MS-4/100 | 60 | 60 | 70 |
| II | 100 parts polymer + 120 parts oil - Mooney ML-4/100 | 8 | 8.5 | 11 |
| III | 100 parts polymer + 120 parts oil + 0.5 parts dibromobutene - Mooney ML-4/100 | 8 | 26.5 | 30 |
| IV | Sample III + polybutadiene + carbon black Mooney ML-4/100 | 43 | 78.5 | — |
|   | Stress-Strain - Elongation % | 400 | 350 | — |
|   | 100% Modulus kg/cm² | 1.8 | 5.2 | — |
|   | 200% Modulus kg/cm² | 1.5 | 7.8 | — |

EXAMPLE 2

To further illustrate the effect of crosslinking the polymer on the Mooney of the product, an SBR polymer containing 23.5 weight percent of bound styrene, 0.91 weight per cent of bound dimethylaminoethyl methacrylate, having a Mooney value (MS-4/100) of 65 and containing 0.7 parts of antioxidant was blended with 37.5 parts by weight per 100 parts by weight of polymer of the aromatic oil of Example 1 to yield an oil extended polymer having a Mooney (ML-4/100) of 47.5 which was then mixed and crosslinked with varying amounts of a dibromopolybutadiene which contains two terminal allylic bromide groups and has a molecular weight of 2,000. The Mooney of the crosslinked polymer was then determined with the results shown in Table 2. The increase in Mooney that can be achieved is readily seen from the results in Table 2.

TABLE 2

|   | Sample | Mooney ML-4/100 |
|---|---|---|
| I | Polymer + 37.5 parts oil | 47.5 |
| II | I + 0.5 parts DBBD* | 62.5 |
| III | I + 1.5 parts DBBD | 70.5 |
| IV | I + 2.5 parts DBBD | 83 |

TABLE 2 -continued

|   | Sample | Mooney ML-4/100 |
|---|---|---|
| V | I + 5 parts DBBD | 91 |

*DBBD = dibromopolybutadiene

EXAMPLE 3

Polymer C of Example 1 was used as a latex. To 400 grams of the latex (25% solids content) was added 2 grams of an unsaponified mixed rosin/fatty acid and sufficient sodium hydroxide was added to bring the pH to 12.3. To this latex was added 11.6 grams of a 13% aqueous emulsion of a diaryl-p-phenylene diamine antioxidant. To this latex, heated to a temperature of about 75° C, is slowly added 120 grams of oil (as in Example 1) under conditions of mild agitation to yield a creamy oil/latex mixture. Separately, a slurry of carbon black is prepared by adding sodium hydroxide solution to 800 grams of distilled water until the pH is 12.5 followed by addition of 16 grams of unsaponified mixed rosin/fatty acid and the whole heated to about 55° C and the pH adjusted, if necessary, to 12.5 to maintain the rosin/fatty acid in solution. 200 grams of HAF carbon black are slowly added to the agitated aqueous mixture to yield a slurry of carbon black. The carbon black slurry is slowly added to the agitated oil/latex mixture while maintaining the temperature at about 75° C. A coagulation mixture is prepared by adding 112 grams of sodium chloride to 2,680 grams of water at a temperature of 54° C and the pH of the solution is adjusted to a pH of 4 by the addition of a solution (acid solution) containing 13.2 grams of sulphuric acid and 333 grams of sodium chloride in 2,650 grams of water. The oil/black/latex mixture is slowly added to the coagulation mixture, under conditions of vigorous agitation, together with sufficient acid solution to maintain the pH in the range of 4–6. On completion of the addition of the oil/black/latex, the pH is adjusted to 4 by addition of the acid solution and the mixture maintained under agitation at 54° C for 30 minutes. The coagulated oil/black/polymer mixture is separated from the aqueous phase, washed thoroughly with water and dried in a forced air heated oven to yield Sample M. A second sample of oil/black/polymer is prepared, the only difference being that the oil added additionally contained 0.7 grams of 1,4-dibromobutene-2, yielding Sample N.

45 grams of Sample M was added to the Banbury mixing head of a Brabender mixer operated at a temperature of 72°–74° C and a rotor speed of 100 rpm and mixed for one minute. 13.75 grams of TAKTENE 1252 were added and the whole mixed for a further four minutes to yield Sample M-1, for which a Mooney value and the green strength stress-strain properties were determined. Similarly, Sample N-1 was prepared and its properties determined.

The results are shown in Table 3 and show the significant improvement for the green strength of the final compound when the styrene-butadiene polymer has been crosslinked with dibromobutene-2.

TABLE 3

| Sample M (SBR 100, oil 120, black 200) | Mooney (ML-4/100) | 88 |
|---|---|---|
| Sample M-1 (SBR + BR 100, oil 80, black 100) | Mooney (ML-4/100) | 36.5 |
|   | Green Strength Stress-Strain |   |
|   | Elongation % | 920 |
|   | 100% Modulus kg/cm² | 1.7 |
|   | 200% Modulus kg/cm² | 1.5 |

TABLE 3 -continued

| | | |
|---|---|---|
| Sample N<br>(SBR 100, oil 120, black<br>200, dibromobutene 0.7) | Mooney (ML-4/100) | 83 |
| Sample N-1<br>(SBR + BR 100, dibromobutene<br>0.35, oil 80, black 100) | Mooney (ML-4/100)<br>Green Strength Stress-Strain<br>Elongation %<br>100% Modulus kg/cm$^2$<br>200% Modulus kg/cm$^2$ | 42<br><br>680<br>2.0<br>2.0 |

EXAMPLE 4

Using the latex of polymer B of Example 1 and following a similar procedure to that of Example 3, additional compounds were prepared for evaluation. Sample P was prepared as for Sample N of Example 3 and containing 120 parts of oil per 100 parts of SBR polymer except that the amount of carbon black was 80 parts by weight per 100 parts by weight of the SBR polymer and the amount of 1,4-dibromobutene-2 was 0.4 grams per 100 grams of SBR polymer. Compound P-1 was prepared as for Compound N-1 of Example 3. Sample Q was prepared as above, the amount of oil being 90 parts and the amount of black being 80 parts per 100 parts of SBR polymer. When the mixture had been coagulated, the pH of the aqueous coagulation mixture was adjusted to 7–7.5 by the addition of acid solution, while the temperature is maintained at about 54° C. 30 grams of oil mixed with 0.4 grams of 1,4-dibromobutene-2 was then added to the coagulation mixture and the whole agitated for a further 5 minutes. The pH of the whole was then lowered to about 4 by the addition of the acid solution, the crumb recovered, washed and dried to yield Sample Q. Compound Q-1 was prepared as for Compound P-1. The properties of these samples are listed in Table 4.

The results show that addition of the dibromobutene crosslinking agent to the coagulation mixture at a pH of about 7–7.5 yielded an improved product as compared to the product formed by adding the dibromobutene to the latex when at a pH of about 12, the improvements being seen in the Mooney values, both at room temperature and at 100° C, (compare Sample P with Sample Q) and in the green strength of the compounds Sample P-1 compared with Sample Q-1.

EXAMPLE 5

Using the Banbury type mixing head of the Brabender mixer, operated at 100° C and 100 rpm rotor speed, the samples listed in Table 5 were prepared. The two SBR polymers contained 23.5 weight percent of bound styrene and 0.89 weight percent of bound dimethylaminoethyl methacrylate. One SBR contained 37.5 parts by weight, per 100 parts by weight of polymer, of a naphthenic oil (Type 103 of ASTM D 2226) and 1.1 weight percent based on polymer, of a diphenyl ethylene diamine stabilizer, had a Mooney (ML-4/100) of 40, and was used only when additional naphthenic oil was added. The second SBR contained 37.5 parts by weight of an aromatic oil (Type 101 of ASTM D 2226), 1 weight percent of a diaryl-p-phenylene diamine antioxidant, had a Mooney (ML-4/100) of 44 and was used only when additional aromatic oil was added. The polymer was added to the mixer and mixed for 1 minute when the crosslinking agent, as a solution in oil, was added, at 3 minutes the balance of the oil was added and at about 4 to 6 minutes the carbon black was added, the exact time depending on the incorporation of the oil. The mixing was terminated at 8 to 10 minutes, the sample being transferred to a room temperature mill and sheeted out. Portions of the sample were used for Mooney measurement and, after molding for 2 minutes at 100° C, for green strength stress-strain determination. The results show that the improvement in green strength, i.e. the combination of good elongation, modulus increasing on extension up to and beyond 200% and a maximum tensile strength at an elongation greater than 200%, is readily achieved when 1,4-dibromobutene-2 or dibromopolybutadiene is used as the crosslinking agent independent of whether the oil is aromatic or naphthenic and independent of the type of carbon black used. The results also show, as illustrated by the Mooney data, that the compounds which do not contain the crosslinking are much too soft to be handled conventionally in a rubber processing factory while those that have been crosslinked have Mooney values which are generally typical for conventional rubber compounds.

TABLE 4

| | | |
|---|---|---|
| Sample P<br>(SBR 100, oil 120, carbon black<br>80, dibromobutene 0.4) | Mooney ML-4/100<br>Mooney at room temperature<br>ML-4<br>ML-8 | 21<br><br>60<br>54 |
| Sample P-1<br>(SBR + BR 100, oil 79,<br>black 100) | Mooney ML-4/100<br>Green Strength Stress-Strain<br>Elongation %<br>100% Modulus kg/cm$^2$<br>200% Modulus kg/cm$^2$ | 56<br><br>700<br>2.4<br>2.7 |
| Sample Q<br>(SBR 100, oil 120, carbon<br>black 80, dibromobutene<br>0.4) | Mooney ML-4/100<br>Mooney at room temperature<br>ML-4<br>ML-8 | 44<br><br>80<br>74 |
| Sample Q-1<br>(SBR + BR 100, oil 79, black 100) | Mooney ML-4/100<br>Green Strength Stress-Strain<br>Elongation %<br>100% Modulus kg/cm$^2$<br>200% Modulus kg/cm$^2$ | 61<br><br>500<br>2.7<br>3.2 |

TABLE 5

|  | W-1 | X-1b | Y-1a | Z-1e | Z-5b | Control Y-2 |
|---|---|---|---|---|---|---|
| Weight of Polymer | --- | --- | 100 | --- | --- | --- |
| Wt. of Crosslinking Agent | 0 | 0.165 | 0 | 0.165 | 3.28 | 0 |
| Type of Crosslinking Agent |  | DBB |  | DBB | DBBD |  |
| Weight of Oil | 50 | 50 | 125 | 125 | 125 | 125 |
| Type of Oil | A | A | A | A | A | A |
| Wt. of Carbon Black | 75 | 75 | 112.5 | 112.5 | 112.5 | 112.5 |
| Type of Carbon Black | HAF | HAF | HAF | HAF | HAF | HAF |
| Mooney ML-4/100 | 49 | 88 | 30 | 52 | 33.5 | 32.5 |
| Green Strength Stress-Strain |  |  |  |  |  |  |
| - Elongation % | 550 | 750 | 940 | 710 | 1300 | 840 |
| - 100% Modulus kg/cm² | 3.4 | 5.8 | 2.1 | 3.1 | 2.3 | 2.3 |
| - 200% Modulus kg/cm² | 2.8 | 8.2 | 2.0 | 4.3 | 2.5 | 2.4 |
| Maximum Tensile Strength kg/cm² | 3.6 | 10.0 | 2.2 | 6.6 | 2.8 | 2.4 |
| Elongation at Maximum Tensile Strength % | 50 | 400 | 60 | 480 | 480 | 220 |
|  | Y-3 | Z-3a | Y-4a | Z-4c | Y-4b | Z-4d |
| Weight of Polymer | --- | --- | 100 | --- | --- | --- |
| Wt. of Crosslinking Agent | 0 | 0.165 | 0 | 0.165 | 0 | 0.165 |
| Type of Crosslinking Agent |  | DBB |  | DBB |  | DBB |
| Weight of Oil | 125 | 125 | 125 | 125 | 125 | 125 |
| Type of Oil | B | B | A | A | A | A |
| Wt. of Carbon Black | 112.5 | 112.5 | 112.5 | 112.5 | 112.5 | 112.5 |
| Type of Carbon Black | HAF | HAF | SAF | SAF | MT | MT |
| Mooney ML-4/100 | 28 | 55 | 35 | 68.5 | 13 | 27.5 |
| Green Strength Stress-Strain |  |  |  |  |  |  |
| - Elongation % | 750 | 550 | 1300 | 690 | 840 | 930 |
| - 100% Modulus kg/cm² | 1.9 | 4.0 | 2.7 | 4.4 | 1.1 | 1.3 |
| - 200% Modulus kg/cm² | 1.7 | 4.9 | 2.6 | 6.0 | 0.9 | 1.4 |
| Maximum Tensile Strength kg/cm² | 2.0 | 5.4 | 2.8 | 7.0 | 1.2 | 3.0 |
| Elongation at Maximum Tensile Strength % | 60 | 340 | 60 | 38a | 80 | 610 |

DBB = 1,4-dibromobutene-2
DBBD = dibromopolybutadiene
Oils - A = aromatic oil; B = naphthenic oil

What is claimed is:

1. A process for the manufacture of an improved masterbatch of synthetic rubber, oil and carbon black wherein a latex of a synthetic $C_4$–$C_8$ conjugated diolefin polymer containing from 0.2 to about 2.5 weight percent of copolymerized monomer containing reactive groups selected from one of tertiary amine, hydroxyl and aldehyde, is mixed with an aqueous slurry containing from about 50 parts to about 250 parts by weight per 100 parts by weight of polymer of carbon black and with a stream containing from about 50 parts to about 150 parts by weight per 100 parts by weight of polymer of oil, the mixture is fed to a coagulation vessel and contacted therein with aqueous acidic coagulation agent, the water wet coagulated polymer-oil-black mixture is separated and dried in a drying means to yield the improved masterbatch, the improvement being the addition to and mixing with the polymer in one of the coagulation vessel or the drying means of a crosslinking agent reactive with the reactive groups of the polymer in sufficient amount to react therewith and cause an improvement in the strength and non-flow characteristics of the polymer, said crosslinking agent containing (a) reactive halogen groups when the reactive groups of the polymer are tertiary amine, or (b) aldehyde groups activated by adjacent carbonyl or methoxy groups when the reactive groups of the polymer are hydroxyl, or (c) hydroxy or mercaptan groups when the reactive groups of the polymer are aldehyde.

2. The process of claim 1 wherein the polymer contains up to 50 percent by weight of a copolymerizable olefinically unsaturated monomer.

3. The process of claim 1 in which the crosslinking agent contains at least two groups capable of reacting with the reactive groups of the copolymerized monomer.

4. The process of claim 3 in which the crosslinking agent is reacted with the reactive groups of the polymer at temperatures of 180° F or higher.

5. The process of claim 3 wherein the crosslinking agent is added to the coagulation vessel.

6. The process of claim 5 in which the crosslinking agent is added to the coagulation vessel wherein the coagulation mixture is at a pH of 6 to 8.

7. The process of claim 3 wherein the crosslinking agent is added to the polymer in the drying means.

8. The process of claim 2 in which the polymer is a styrene-butadiene polymer containing from 15 to 40 weight percent of styrene and not more than 1.5 weight percent of copolymerized monomer containing reactive groups.

9. An improved masterbatch of synthetic rubber, oil and carbon black which comprises 100 parts by weight of a synthetic $C_4$–$C_8$ conjugated diolefin polymer containing from 0.2 to about 2.5 weight percent of copolymerized monomer containing reactive groups selected from one of tertiary amine, hydroxyl and aldehyde, from about 50 to about 150 parts by weight of oil and from about 50 to about 250 parts by weight of carbon black and a sufficient amount of cross-linking agent to react with the reactive groups of the polymer to cause an improvement in the strength and non-flow characteristics of the polymer.

10. The masterbatch of claim 9 wherein said crosslinking agent contains (a) reactive halogen groups when the reactive groups of the polymer are tertiary amine, or (b) aldehyde groups activated by adjacent carbonyl or methoxy groups when the reactive groups of the polymer are hydroxyl, or (c) hydroxy or mercaptan groups when the reactive groups of the polymer are aldehyde.

11. The masterbatch of claim 9 in which the polymer contains up to 50 percent by weight of a copolymerizable olefinically unsaturated monomer selected from styrene, alphamethylstyrene, vinyl toluene, acrylonitrile, methacrylonitrile and vinyl pyridine.

12. The masterbatch of claim 11 wherein the copolymerized monomer is of the general form

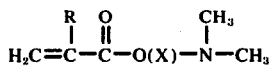

where R is hydrogen or methyl and X is an aliphatic hydrocarbon group of 2 to 4 carbon atoms or a secondary or tertiary amine substituted aliphatic hydrocarbon group of 2 to 4 carbon atoms.

13. The masterbatch of claim 12 in which the crosslinking agent is selected from 1,4-dibromobutene-2; 1,4-dichlorobutene-2; α,α,'-dibromo-p-xylene; α,α'-dichloro-p-xylene and liquid dibromopolybutandiene having essentially terminal allylic bromide groups and a molecular weight of about 800 to about 2,000.

14. The masterbatch of claim 13 wherein the copolymerized monomer is dimethylaminoethyl methacrylate.

15. The masterbatch of claim 11 in which the copolymerized monomer is of the general form

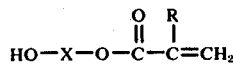

where R is hydrogen or methyl and X is an aliphatic hydrocarbon group of 2 to 4 carbon atoms.

16. The masterbatch of claim 15 in which the crosslinking agent is a polyaldehyde compound of form

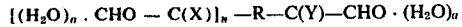

in which R is an organic group comprising one or more aromatic rings or an aliphatic group having not less than three carbon atoms one of which is quaternary, $n$ is 1 or 2, X and Y are the same and are selected from oxygen or di(methoxy) and $a$ is 0 or 1.

17. The masterbatch of claim 16 wherein the polyaldehyde compound is selected from 1,3,5-triglyoxalyl benzene; 1,2-diglyoxalyl benzene; 1,4-diglyoxalyl benzene; 4,4'-diglyoxalyl biphenyl; 4,4'-diglyoxalyl biphenyl ether, 4,4'-bis(dimethoxy formyl methyl) biphenyl ether and 2,2-diglyoxalyl propane.

* * * * *